United States Patent [19]

Yoshikawa

[11] Patent Number: 5,308,017
[45] Date of Patent: May 3, 1994

[54] SPINNING REEL WITH A SHOCK ABSORBING MECHANISM

[75] Inventor: Osamu Yoshikawa, Sakai, Japan

[73] Assignee: Shimano Inc., Osaka, Japan

[21] Appl. No.: 993,955

[22] Filed: Dec. 15, 1992

Related U.S. Application Data

[63] Continuation of Ser. No. 711,963, Jun. 7, 1991, abandoned.

[30] Foreign Application Priority Data

Jun. 20, 1990 [JP] Japan .................. 2-65264[U]
Jun. 20, 1990 [JP] Japan .................. 2-65265[U]

[51] Int. Cl.⁵ .................................. A01K 89/01
[52] U.S. Cl. ................................ 242/241; 242/311
[58] Field of Search ............. 242/241, 321, 246; 384/215, 220, 222, 223

[56] References Cited

U.S. PATENT DOCUMENTS

| | | | |
|---|---|---|---|
| 3,352,507 | 11/1967 | Boussageon | 242/241 X |
| 3,437,282 | 4/1969 | Honkonen et al. | 242/241 X |
| 3,544,030 | 12/1970 | Daniels | 242/241 X |
| 4,512,531 | 4/1985 | Tunoda | 242/241 |
| 4,770,363 | 9/1988 | Tsunoda et al. | 242/241 |
| 4,773,611 | 9/1988 | Kaneko | 242/241 |
| 4,865,262 | 9/1989 | Tsunoda | 242/241 |

FOREIGN PATENT DOCUMENTS 2246059 1/1992 United Kingdom ........... 242/241

Primary Examiner—Daniel P. Stodola
Assistant Examiner—Eileen A. Dunn
Attorney, Agent, or Firm—Dickstein, Shapiro & Morin

[57] ABSTRACT

A spinning reel comprising a reel body, a handle operable to take up a fishing line on a spool, and an oscillating mechanism. The oscillating mechanism is mounted in the reel body, and includes a screw shaft rotatable by drive from a transmission line leading from the handle, an insert piece engaging a helical groove defined on the screw shaft, a transmission member for transmitting a moving force of the insert piece to a spool shaft, and a cushioning device for mitigating shocks imparted from a position forwardly of the spool shaft. The cushioning device is disposed in a portion extending from a position of the reel body for supporting the screw shaft through the insert piece to an intermediate position of the spool shaft.

6 Claims, 5 Drawing Sheets

SPINNING REEL WITH A SHOCK ABSORBING MECHANISM

This application is a continuation of application Ser. No. 07/711,963 field Jun. 7, 1991, now abandoned.

BACKGROUND OF THE INVENTION

1. Field of the Invention

This invention relates to spinning reels, and more particularly to a spinning reel having an oscillating mechanism mounted in a reel body and including a screw shaft rotatable by drive imparted from a handle, an insert piece meshed with an endless helical groove defined on the screw shaft, and a transmission member for transmitting a force of movement from the insert piece to a spool shaft. Especially, the invention relates to an improvement in protection of the oscillating mechanism.

2. Description of the Related Art

A spinning reel as constructed above is disclosed in Japanese Utility Model Publication Kokai No. 1989-168168, for example. In this prior construction, the screw shaft is rotatably engaged and supported at a rear end thereof in a recess defined in the reel body.

People often fish at night, and on such occasions attach the spinning reel to the reel seat of a fishing rod by fumbling touch. Consequently, the spinning reel could be attached only incompletely and could be dropped to the ground or a concrete surface.

When the reel falls with the spool down, the impact of the fall concentrates between the screw shaft and insert piece because of a relatively small contact area between the screw shaft and insert piece. This could damage the screw shaft or insert piece, thereby impairing a smooth operation of the oscillating mechanism.

It will be appreciated that, since this type of oscillating mechanism is constructed to move the spool back and forth with rotation of the screw shaft, the screw shaft must be supported by the reel body.

SUMMARY OF THE INVENTION

An object of the present invention is to provide an improved spinning reel which assures a smooth operation of the oscillating mechanism even if the reel is dropped with the spool down.

The above object is fulfilled, according to the present invention, by a spinning reel comprising an oscillating mechanism as noted hereinbefore, which includes a cushioning device disposed in a portion extending from a position of the reel body for supporting the screw shaft through the insert piece to an intermediate position of the spool shaft for mitigating shocks acting from a position forwardly of the spool shaft.

With this construction, as shown in FIG. 1 for example, the cushioning device B mitigates any shocks acting rearwardly of the spool shaft 9. This reduces a pressing force acting between a helical groove 11A and an insert piece 12.

Thus, the present invention employs the cushioning device B which necessitates only a simple modification to the reel construction, instead of reinforcing the helical groove 11A and insert piece 12. This construction realizes a reduced peak value of shocks, thereby to protect the helical groove 11A and insert piece 12 from damage.

Consequently, even when the reel is inadvertently dropped with the spool down, the oscillating mechanism will not suffer loss of its smooth operation. This is achieved by employment of the cushioning device which amounts to a relatively simple modification.

Other features and advantages of the present invention will be apparent from the following description made with reference to the accompanying drawings.

BRIEF DESCRIPTION OF THE DRAWINGS

The drawings show spinning reels according to the present invention, in which.

DETAILED DESCRIPTION OF THE PREFERRED EMBODIMENTS

Spinning reels embodying the present invention will be described in detail with reference to the drawings.

Figure 1:
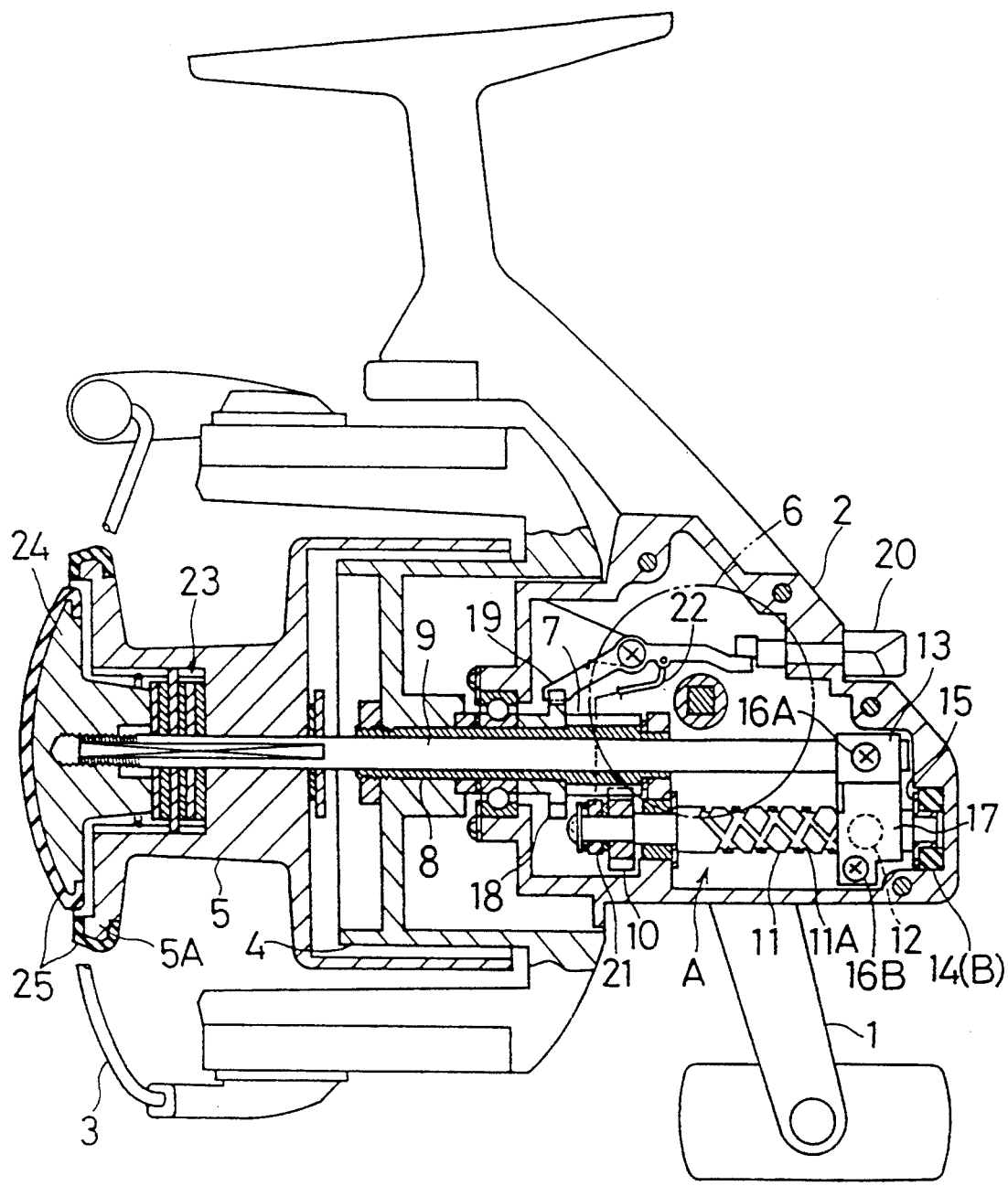
FIG. 1 is a side view in vertical section of a spinning reel.

As shown in FIG. 1, a spinning reel comprises a handle 1 attached to a reel body 2, and a rotor 4 having a bail arm 3 and a spool 5 disposed forwardly of the reel body 2. The reel body 2 includes a transmission line for transmitting drive from a drive gear 6 rotatable by turning the handle 1, to the rotor 4 through a pinion gear 7 and a sleeve shaft 8, and an oscillating mechanism A for receiving drive from the pinion gear 7 and converting the drive into a fore and aft reciprocating movement for transmission to a spool shaft 9.

Figure 2:
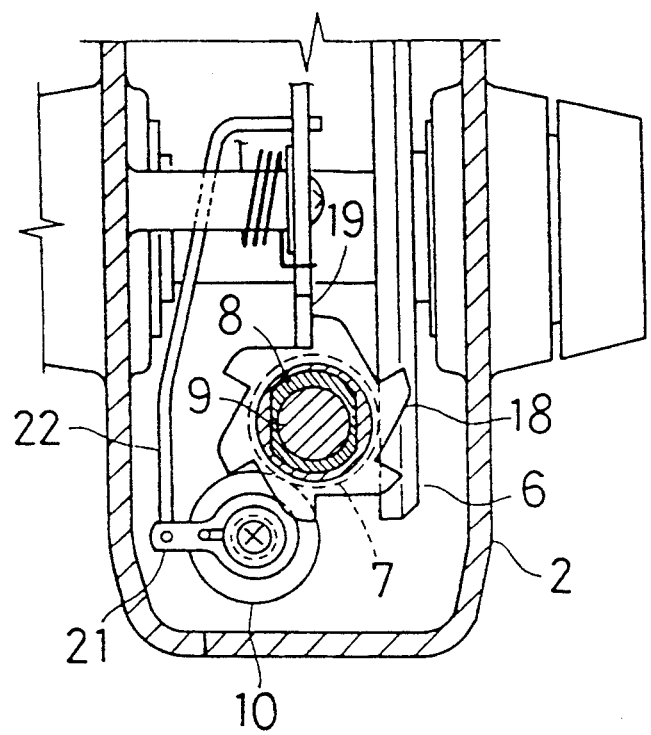
FIG. 2 is a front view in vertical section showing a ratchet wheel and adjacent components.
Figure 3:
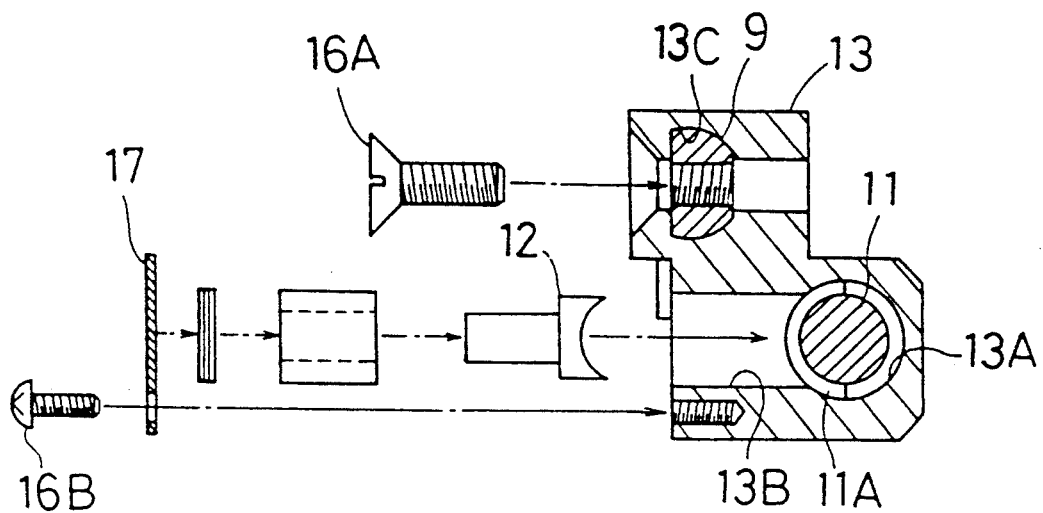
FIG. 3 is an exploded sectional view of a transmission member.

As shown in FIGS. 1 through 3, the oscillating mechanism A includes a screw shaft 11 carrying an input gear 10 mounted on one end thereof and meshed with the pinion gear 7, an insert piece 12 engaging an endless helical groove 11A defined on the screw shaft 11, and a transmission member 13 for transmitting a moving force from the insert piece 12 to the spool shaft 9. A rubber element 14 is fitted into a recess formed in the reel body 2 for supporting a rear end of the screw shaft 11. This rubber element 14 acts as a cushioning device B for mitigating shocks acting from a forward end of the spool shaft 9. A bush 15 is provided for allowing the rear end of the screw shaft 11 to be freely rotatably supported by the rubber element 14. It will be appeciated, however, that the cushioning device B is not limited to the rubber element 14 formed of natural rubber or synthetic rubber, for example. Various cushioning materials may be employed therefor, and any material capable of absorbing shocks will serve the purpose.

The transmission member 13 defines a through hole 13A for receiving the screw shaft 11, a bore 13B extending perpendicular to the through hole 13A for receiving the insert piece 12, and an engaging bore 13C for engaging the rear end of the spool shaft 9. The spool shaft 9 is held in position by a screw 16A, while the bore 13B is closed with a plate 17 held in position by a screw 16B.

The sleeve shaft 8 carries a ratchet wheel 18 fixed thereto. An arm 19 is movable by a control device 20 between a position for engaging the ratchet wheel 18 and a position retracted therefrom. A cam 21 is fitted on the screw shaft 11, which is interlocked with the arm 19 through a rod 22. By this interlocking construction, an engaging end of the arm 19 in the position for engaging the ratchet wheel 18 is swung to the ratchet wheel 18 only when the handle 1 is turned in a direction to feed out a fishing line.

The cam 21 is fitted on a forward end of the screw shaft 11 with a predetermined friction to allow rotation of the screw shaft 11 and at the same time to be oscillatable with the rotation.

To enhance resistance to the shocks occurring when the reel is inadvertently dropped, this invention also provides rubber elements 25 attached to a front face of a knob 24 for operating a drag mechanism 23 mounted in a forward end of the spool 5, and to outer peripheries of a forward flange of the spool 5.

Figure 4:
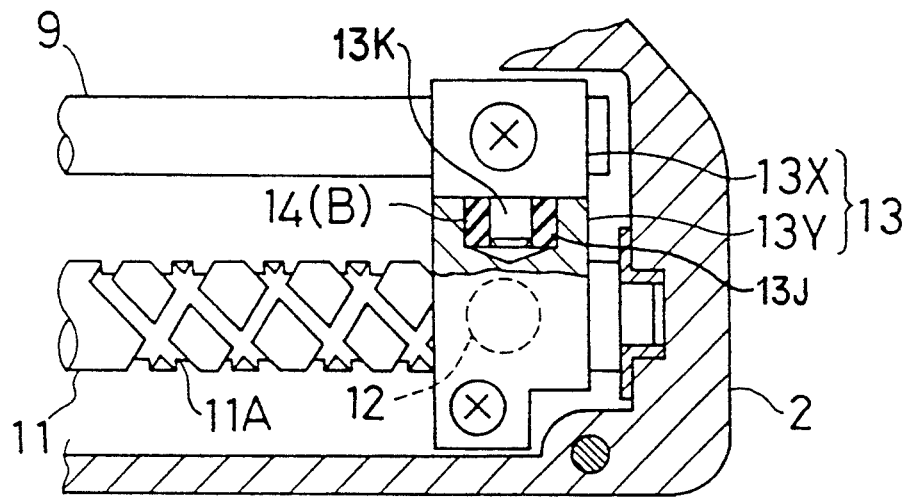
FIGS. 4 and 5 are sectional views of modified cushioning devices.

FIG. 4 shows a modified construction in which the transmission member 13 includes a part 13X connected to the spool shaft 9, and a part 13Y fitted on the screw shaft 11. A rubber element 14 acting as a cushioning device B is mounted between the two parts 13X and 13Y. An engaging means 13K is received by an engageable means 13J. The engageable means 13J extends in a direction normal to the spool shaft 9. The rubber element 14 is located within the engageable means 13J. The engaging means 13K is located within the rubber element 14.

Figure 5:
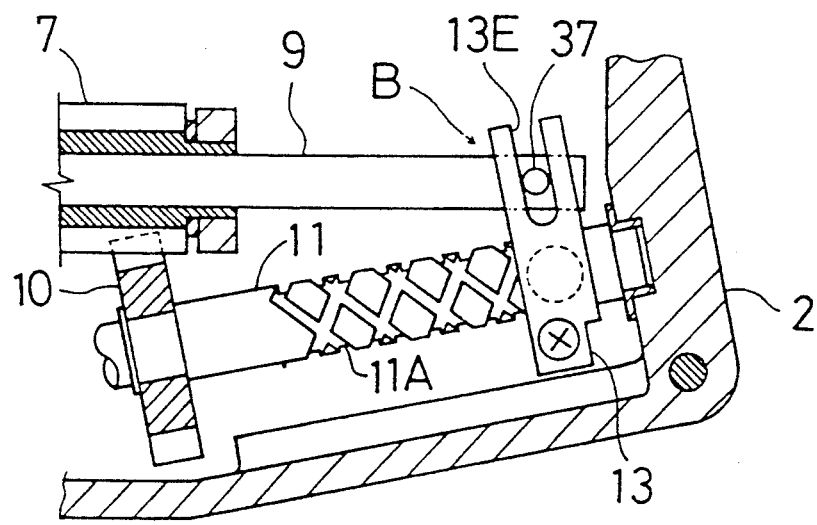

As shown in FIG. 5, the screw shaft 11 may be disposed at an angle to the spool shaft 9. The screw shaft 11 carries a transmission member 13 defining a cutout 13E for engagement with a pin 37 projecting from the spool shaft 9. This construction provides a cushioning device B that produces a component of force to displace the screw shaft 11 away from the spool shaft 9 when shocks act from the forward end of the spool shaft 9.

According to the present invention, various other cushioning constructions are possible, such as dividing the spool shaft into two parts with a spring interposed therebetween to act as a cushion, or cushioning devices provided in a plurality of locations.

In another embodiment of the invention, the transmission member 13 may in the form of a link oscillatable to transmit the moving force of the insert piece 12 to the spool shaft 9.

Figure 6:
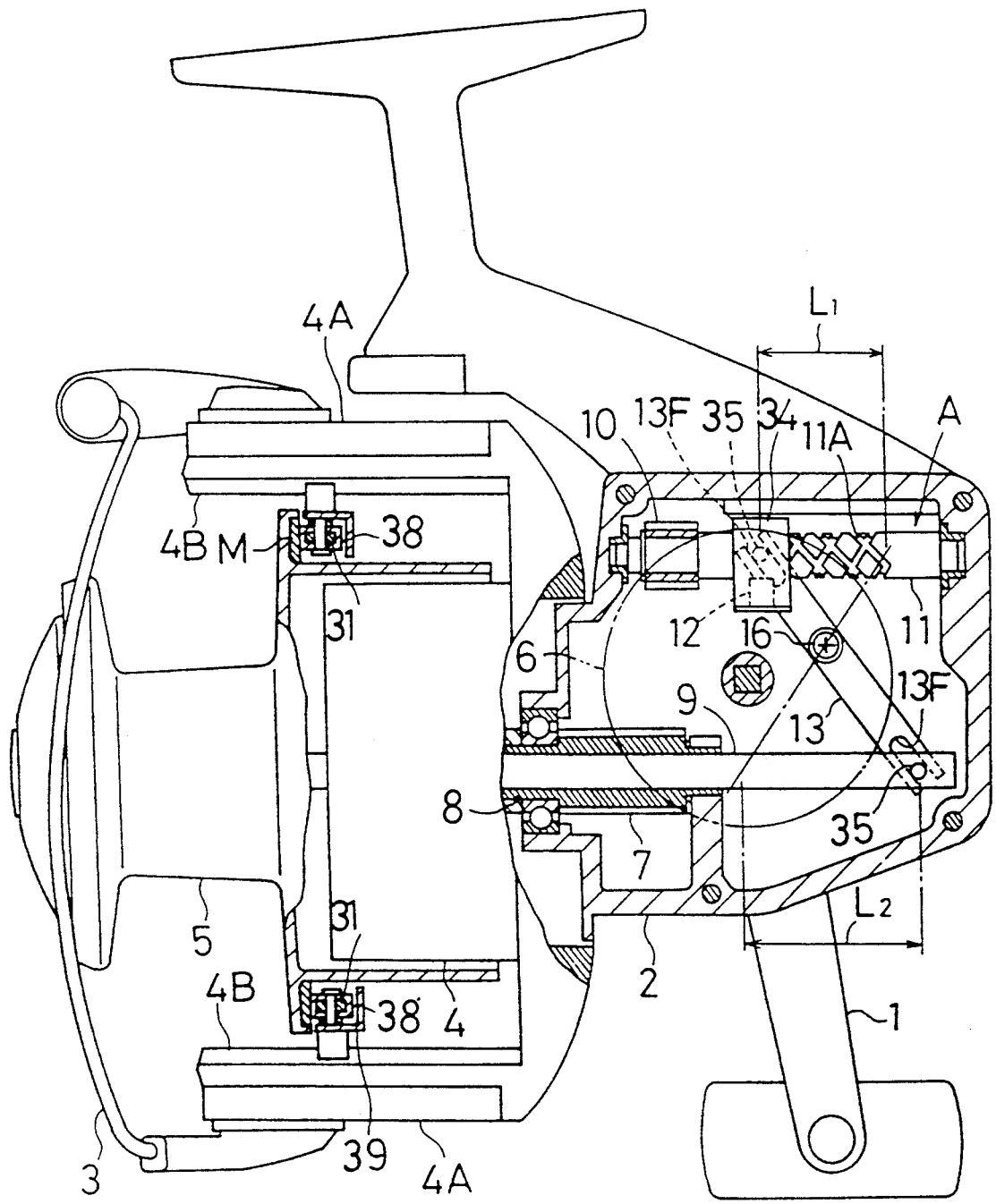
FIG. 6 is a side view in vertical section of a spinning reel in another embodiment of the invention.

In the construction shown in FIG. 6, for example, the moving force of the insert piece 12 produced by rotation of the screw shaft 11 is transmitted in the form of oscillations to the spool shaft 9, thereby reciprocating the latter.

That is, this embodiment transmits the moving force of the insert piece 12 to the spool shaft 9 after converting it into an oscillating force of the transmission member 13. It is therefore unnecessary to arrange the screw shaft 11 and spool shaft 9 parallel to each other. Further, the construction for converting the moving force of the insert piece 12 into an oscillating force of the transmission member 13 is smoothly operable without setting the posture of the transmission member 13 with high precision relative to the screw shaft 11. Thus, compared with the prior art, this construction has the advantage of requiring little precision in arranging the screw shaft 11 and spool shaft 9.

There is little chance of producing twists even if the screw shaft and spool shaft are not arranged in predetermined postures. Therefore, the spinning reel is manufactured with ease, which has the oscillating mechanism smoothly operable without requiring a high degree of manufacturing precision.

Figure 7:
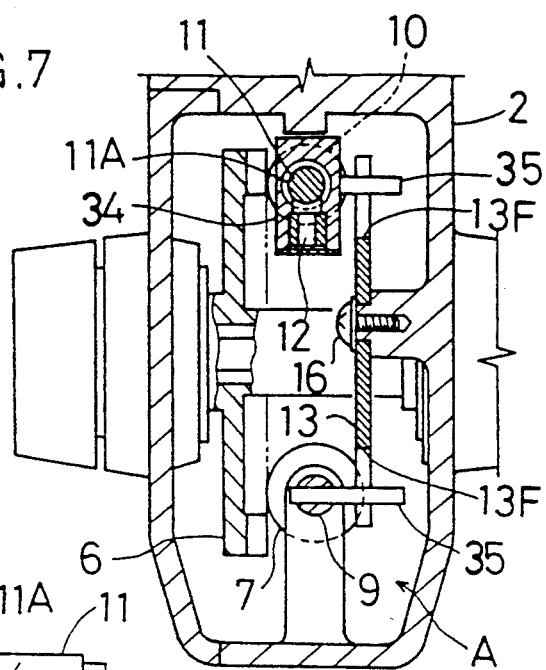
FIG. 7 is a rear view in vertical section of an oscillating mechanism.

More specifically, as shown in FIGS. 6 and 7, the oscillating mechanism A includes a screw shaft 11 carrying an input gear 10 mounted on one end thereof and meshed with a drive gear 6, an insert piece 12 engaging an endless helical groove 11A defined on the screw shaft 11, and a transmission member 13 for transmitting a moving force from the insert piece 12 to a spool shaft 9. In this reel, the transmission member 13 is in the form of a link which is oscillatable to transmit the moving force of the insert piece 12 to the spool shaft 9.

The insert piece 12 is supported in a movable element 34 slidably mounted on the screw shaft 11. The transmission member 13 is supported to be oscillatable relative to a reel body 2 about a screw 16, and defines cutouts 13F at opposite ends thereof for engaging a pin 35 projecting from the movable element 34 and a pin 35 projecting from the spool shaft 9, respectively.

As shown in FIG. 6, the transmission member 13 has such an arm ratio as to transmit a stroke L1 of the insert piece 12 determined by the helical groove 11A of the screw shaft 11 to the spool shaft 9 as enlarged to a stroke L2. In this way, the oscillating mechanism A is devised to reduce the length of the screw shaft 11.

This reel includes a rotor 4 driven by a pinion gear 7 which is different in number of teeth from the input gear 10 mounted on the screw shaft 11, so that the reciprocation of the spool 5 synchronizes with rotation of the rotor 4 in frequent cycles.

Further, the spool 5 carries a flange-like magnet M on a skirt portion thereof, while the rotor 4 carries rollers 38 containing iron cores 31 and supported by an annular element 39 engaging guide grooves 4B defined on arms 4A of the rotor 4. The magnet M attracting the iron cores 31 prevents the fishing line wound on the spool 5 from entering the skirt portion.

Figure 8:
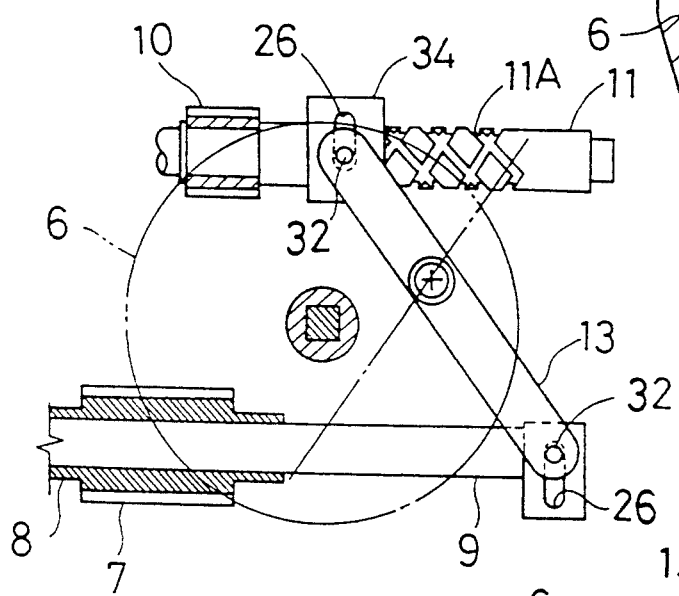
FIGS. 8 and 9 are side views of modified transmission members.

By way of modification, as shown in FIG. 8, the movable element 34 and spool shaft 9 may define slots 26, with the transmission member 13 including pins 13 projecting from the opposite ends thereof and engaging the slots 26, respectively.

Figure 9:
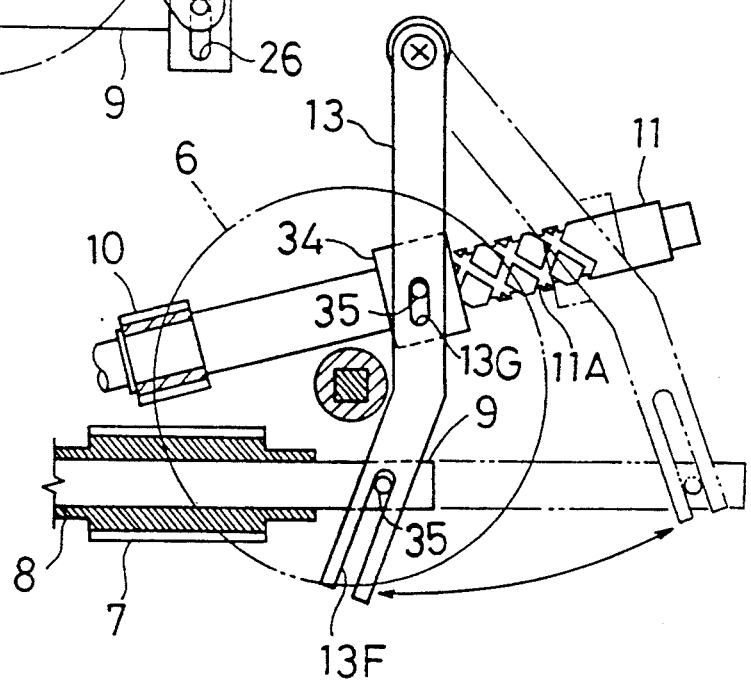

In a further modification, as shown in FIG. 9, the screw shaft 11 may be disposed at an angle to the spool shaft 9, with the transmission member 13 supported at an end thereof by the reel body 2. In this construction, the transmission member 13 has the other end defining a cutout 13F for engaging a pin 35 projecting from the spool shaft 9, and includes a slot 13G defined in an intermediate position for engaging a pin 35 projecting from the movable element 34.

In these modifications, like numerals are used to identify like components in the preceding embodiments.

According to the present invention, the transmission member may have an arm ratio for moving the spool shaft by an amount equal to or less than the stroke of the insert piece. Such an arm ratio may be varied with change of the spool.

What is claimed is:

1. A spinning reel comprising:
a reel body;
an oscillating spool shaft having a spool at a first end thereof;
a handle;
a drive mechanism coupled to said handle for rotating a rotor to take up a fishing line on said spool upon operation of said handle;

an oscillating mechanism for oscillating said spool shaft, said oscillating mechanism being mounted in said reel body and including:
- a screw shaft having a helical groove and mounted in said reel body, and a screw drive mechanism coupled to said handle for rotating said screw shaft;
- a transmission member with a first end fixed at a second end of said spool shaft, and a second end of said transmission member being axially displaceably mounted to said screw shaft;
- an insert piece mounted on said transmission member, said insert piece including an engaging portion to engage with said helical groove of said screw shaft;
- wherein said oscillating mechanism converts a rotation of said screw shaft to said oscillating movement of said spool shaft and spool; and cushion means including an elastic member provided between an end of said screw shaft and said reel body, said cushion means being capable of absorbing displacement of said spool shaft and said screw shaft with respect to said reel body produced in a direction axially of said spool shaft.

2. A spinning reel of claim 1 wherein a forward end of said screw shaft is displaceable at least axially rearwardly of said screw shaft, and said cushion means are provided between a bush means to receive a rear end of said screw shaft and said reel body, said cushion means being capable of absorbing displacement of said spool shaft and said screw shaft produced in a direction axially rearwardly of said spool shaft.

3. A spinning reel of claim 2 wherein said cushion means is a rubber member.

4. A spinning reel comprising:
a reel body;
an oscillating spool shaft having a spool at a first end thereof;
a handle;
a drive mechanism coupled to said handle for rotating a rotor to take up a fishing line on said spool upon operation of said handle;
an oscillating mechanism for oscillating said spool shaft, said oscillating mechanism being mounted in said reel body and including:
- a screw shaft having a helical groove and mounted in said reel body, and a screw drive mechanism coupled to said handle for rotating said screw shaft;
- a transmission member comprising first and second transmission member elements, said first transmission member element having an end fixed at a second end of said spool shaft, said second transmission member element being axially displaceably mounted to said screw shaft;
- an insert piece mounted on said second transmission member element, said insert piece including an engaging portion to engage said helical groove of said screw shaft;
- said oscillating mechanism converting a rotation of said screw shaft to said oscillating movement of said spool; and cushion means provided between said first and second transmission member elements, said cushion means being capable of absorbing displacement of said spool shaft with respect to said second transmission member element produced in a direction axially of said spool shaft.

5. A spinning reel of claim 4 wherein said first and second transmission member elements each have sliding surfaces which are parallel to said spool shaft, said sliding surfaces contacting each other to allow a relative sliding movement between them in a direction along said spool shaft, and an engageable means extending substantially normally to said spool shaft, and engaging means received by said engageable means.

6. A spinning reel of claim 5 wherein said cushion means is a rubber member, said rubber member (14B) being located within said engageable means (13J), said engaging means (13K) being located within said rubber member.

* * * * *